(12) United States Patent
Ogahara et al.

(10) Patent No.: US 12,741,712 B2
(45) Date of Patent: Sep. 22, 2026

(54) SADDLE-RIDE TYPE VEHICLE

(71) Applicant: HONDA MOTOR CO., LTD., Tokyo (JP)

(72) Inventors: Atsushi Ogahara, Tokyo (JP); Tsubasa Nose, Tokyo (JP); Chikashi Iizuka, Tokyo (JP); Masaki Nakagawara, Tokyo (JP); Masaki Naito, Tokyo (JP); Kiyotaka Sakai, Tokyo (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 18/718,193

(22) PCT Filed: Sep. 5, 2022

(86) PCT No.: PCT/JP2022/033312

§ 371 (c)(1),
(2) Date: Jun. 10, 2024

(87) PCT Pub. No.: WO2023/112400

PCT Pub. Date: Jun. 22, 2023

(65) Prior Publication Data

US 2025/0074530 A1 Mar. 6, 2025

(30) Foreign Application Priority Data

Dec. 13, 2021 (JP) ................................ 2021-201978

(51) Int. Cl.
*B62J 45/41* (2020.01)
*B62H 5/02* (2006.01)
*B62J 45/413* (2020.01)

(52) U.S. Cl.
CPC ............. *B62J 45/413* (2020.02); *B62H 5/02* (2013.01)

(58) Field of Classification Search
CPC ............................................ G01M 17/04–065
See application file for complete search history.

(56) References Cited

U.S. PATENT DOCUMENTS 9,738,339 B1 * 8/2017 Jain .......................... B62J 45/42
2009/0248256 A1 * 10/2009 Nishijima .............. B60Q 1/115
701/49

(Continued)

FOREIGN PATENT DOCUMENTS

JP 3154114 U 10/2009
JP 2010-132187 A 6/2010

(Continued)

OTHER PUBLICATIONS

English translation of the International Preliminary Report on Patentability issued Jun. 13, 2024 in corresponding International application No. PCT/JP2022/033312 (5 pages).

(Continued)

*Primary Examiner* — Alexander A Mercado
(74) *Attorney, Agent, or Firm* — Rankin, Hill & Clark LLP

(57) ABSTRACT

There is provided a saddle-ride vehicle in which an attitude of the vehicle is less likely to become unstable when a rider shifts a main stand from an upright state to a retracted state to cause a wheel to touch a road surface. A saddle-ride vehicle according to the present disclosure includes: a main stand (35) that is turnably provided on a vehicle body (5) and holds the vehicle body (5) so that the vehicle body (5) does not topple over; a first detection unit (36) that detects a turning state of the main stand (35); a steering actuator (30) that applies torque in a steering direction to a suspension apparatus (31) supporting a steering wheel (13); and a control apparatus (34) that controls the steering actuator (30) to apply the torque to the suspension apparatus (31), in which the control apparatus (34) performs control to apply (Continued)

the torque so that the steering wheel (31) is directed toward a front (FR), depending on the turning state of the main stand (35).

7 Claims, 7 Drawing Sheets

(56) References Cited

U.S. PATENT DOCUMENTS

| | | | | |
|---|---|---|---|---|
| 2017/0008421 | A1* | 1/2017 | Koizumi | B60L 3/0061 |
| 2018/0257728 | A1* | 9/2018 | Kanehara | B62K 5/027 |
| 2022/0185415 | A1* | 6/2022 | Nagata | B62K 5/027 |
| 2022/0371676 | A1 | 11/2022 | Iizuka et al. | |

FOREIGN PATENT DOCUMENTS

| | | | |
|---|---|---|---|
| JP | 2015-081565 | A | 4/2015 |
| JP | 2015-136977 | A | 7/2015 |
| JP | 2020-142782 | A | 9/2020 |
| JP | 2021-054328 | A | 4/2021 |
| WO | 2021/065649 | A1 | 4/2021 |

OTHER PUBLICATIONS

International Search Report dated Oct. 25, 2022, Application No. PCT/JP2022/033312; 4 pages.

* cited by examiner

SADDLE-RIDE TYPE VEHICLE

TECHNICAL FIELD

The present invention relates to a saddle-ride vehicle.

BACKGROUND ART

Conventionally, steering assist apparatuses that control the attitude of vehicles are known. For example, Patent Literature 1 describes a steering assist apparatus for a saddle-ride vehicle that can enhance effect of stabilizing a vehicle body even in a situation in which the tires are likely to slip (see Japanese Patent Laid-Open No. 2021-54328).

CITATION LIST

Patent Literature

[Patent Literature 1]

Japanese Patent Laid-Open No. 2021-54328

SUMMARY OF INVENTION

Technical Problem

There has been a problem in which the steering wheel rotates to cause an attitude of the vehicle to be likely to become unstable when a rider stands a main stand (center stand) and when a rider shifts the main stand from an upright state to a retracted state to cause a wheel to touch a road surface.

The present invention has been made in view of the above-mentioned circumstances, and an object of the present invention is to provide a saddle-ride vehicle, an attitude of which is unlikely to become unstable when a rider stands a main stand and when a rider shifts the main stand from an upright state to a retracted state to cause a wheel to touch a road surface.

Solution to Problem

An aspect of the present invention is a saddle-ride vehicle including: a main stand that is turnably provided on a vehicle body and holds the vehicle body so that the vehicle body does not topple over; a first detection unit that detects a turning state of the main stand; a steering actuator that applies torque in a steering direction to a suspension apparatus supporting a steering wheel; and a control apparatus that controls the steering actuator to apply the torque to the suspension apparatus, in which the control apparatus performs control to apply the torque so that the steering wheel is directed toward a front, depending on the turning state of the main stand.

Note that this description includes all the contents of Japanese Patent Application No. 2021-201978 filed on Dec. 13, 2021.

Advantageous Effect of Invention

An aspect of the present invention makes it possible to prevent the attitude of the saddle-ride vehicle from becoming unstable when a rider stands a main stand and when a rider shifts the main stand from an upright state to a retracted state to cause a wheel to touch a road surface.

BRIEF DESCRIPTION OF DRAWINGS

FIG. 5 is a flowchart of control processing according to a modified embodiment.

FIG. 7 is a flowchart of control processing.

DESCRIPTION OF EMBODIMENTS

Figure 1:
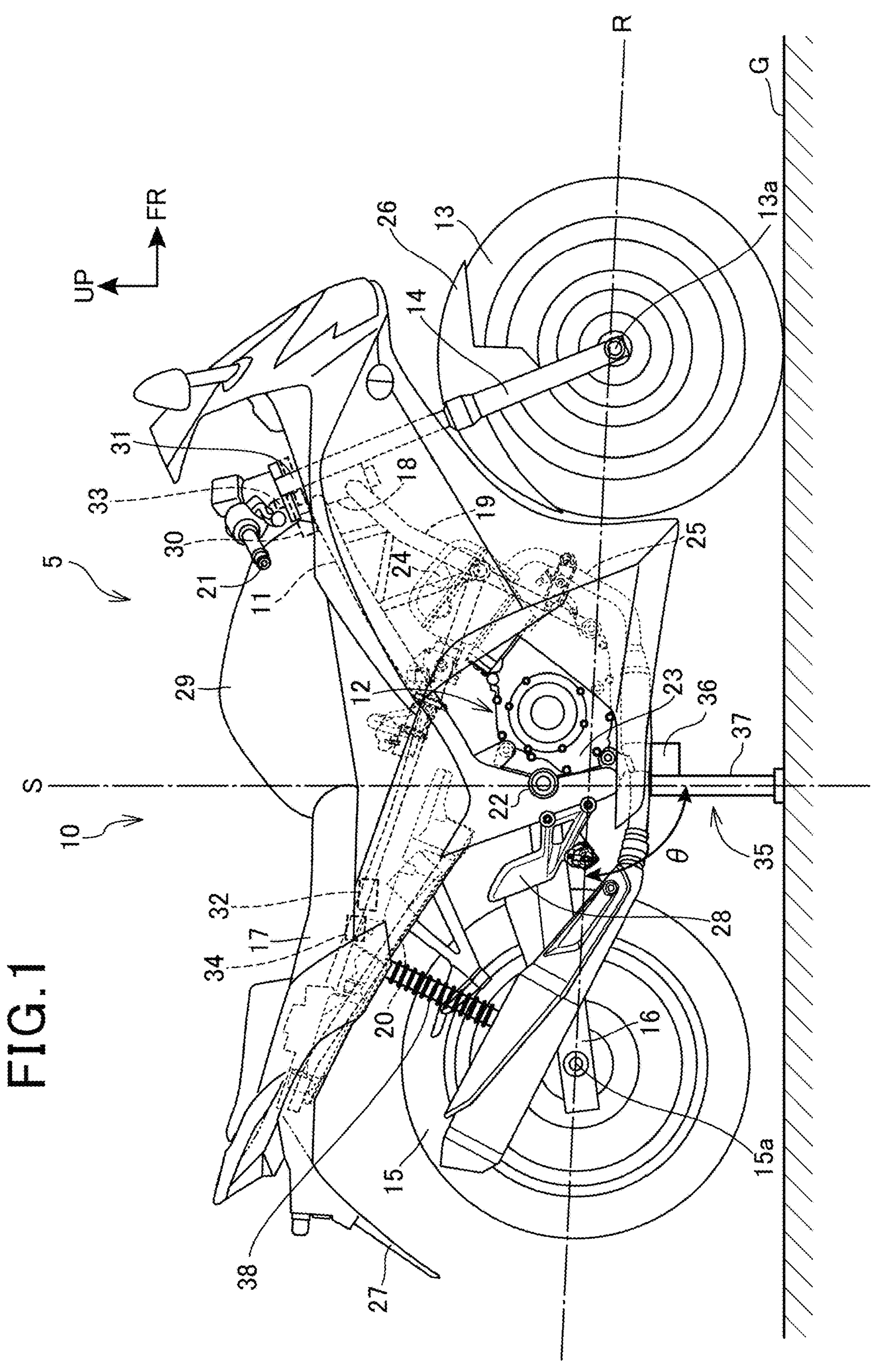
FIG. 1 is a side view of a saddle-ride vehicle.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13*a* provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15*a* provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The rear wheel 15 is supported by a suspension 38. The suspension 38 softens the impact transmitted from the road surface G to the vehicle 10.

A main stand 35 is provided below the vehicle body 5 to hold the vehicle body 5 not to topple over. The main stand 35 has at least two support portions 37 in the vehicle width direction. The rider U places his or her leg on a protrusion (not shown) provided on the support portions 37 of the main stand 35 and turns the main stand 35 so that the main stand 35 holds the vehicle body.

Here, there is a first detection means 36 that detects information regarding a turning state of the main stand. Turning states includes a retracted state in which the main stand 35 is retracted, and a vehicle holding state in which the vehicle 10 is held. Specifically, the first detection means 36 detects, for example, an angle θ between a roll axis R of the vehicle 10 and a longitudinal axis S of the support portions 37. When the angle θ is smaller than 45 degrees, for example, the front wheel (steering wheel) 13 and the rear wheel 15 touch the road surface G, and the main stand 35 is in the retracted state. When the angle θ is, for example, 90 degrees, the vehicle 10 has the rear wheel 15 being off the road surface G and the main stand 35 holding the vehicle (see FIG. 1).

The vehicle 10 includes a vehicle behavior detection means 32 that detects behavior information of the vehicle body 5. The behavior information of the vehicle body 5 includes a roll angle, a roll angular velocity (roll rate), a yaw angle, a yaw angular velocity (yaw rate), a pitch angle and a pitch angular velocity (pitch rate), and acceleration and angular acceleration, of the vehicle body 5. The vehicle behavior detection means 32 is, for example, an inertial measurement unit (IMU) that detects translational motion and rotational motion in a plurality of directions perpendicular to each other. The vehicle behavior detection means 32 includes a second detection means 49 that detects the pitch angular velocity (pitch rate) of the vehicle body 5.

The control apparatus 34 is an ECU (electronic control unit), and is provided below the seat 17. The control apparatus 34 includes a CPU (central processing unit), a RAM (random access memory) and a ROM (read only memory), and executes various control. The CPU is a central processing unit, and executes various programs to realize various functions. The RAM is used as a work area and storage area for the CPU, and the ROM stores an operating system and programs executed by the CPU.

Figure 2:
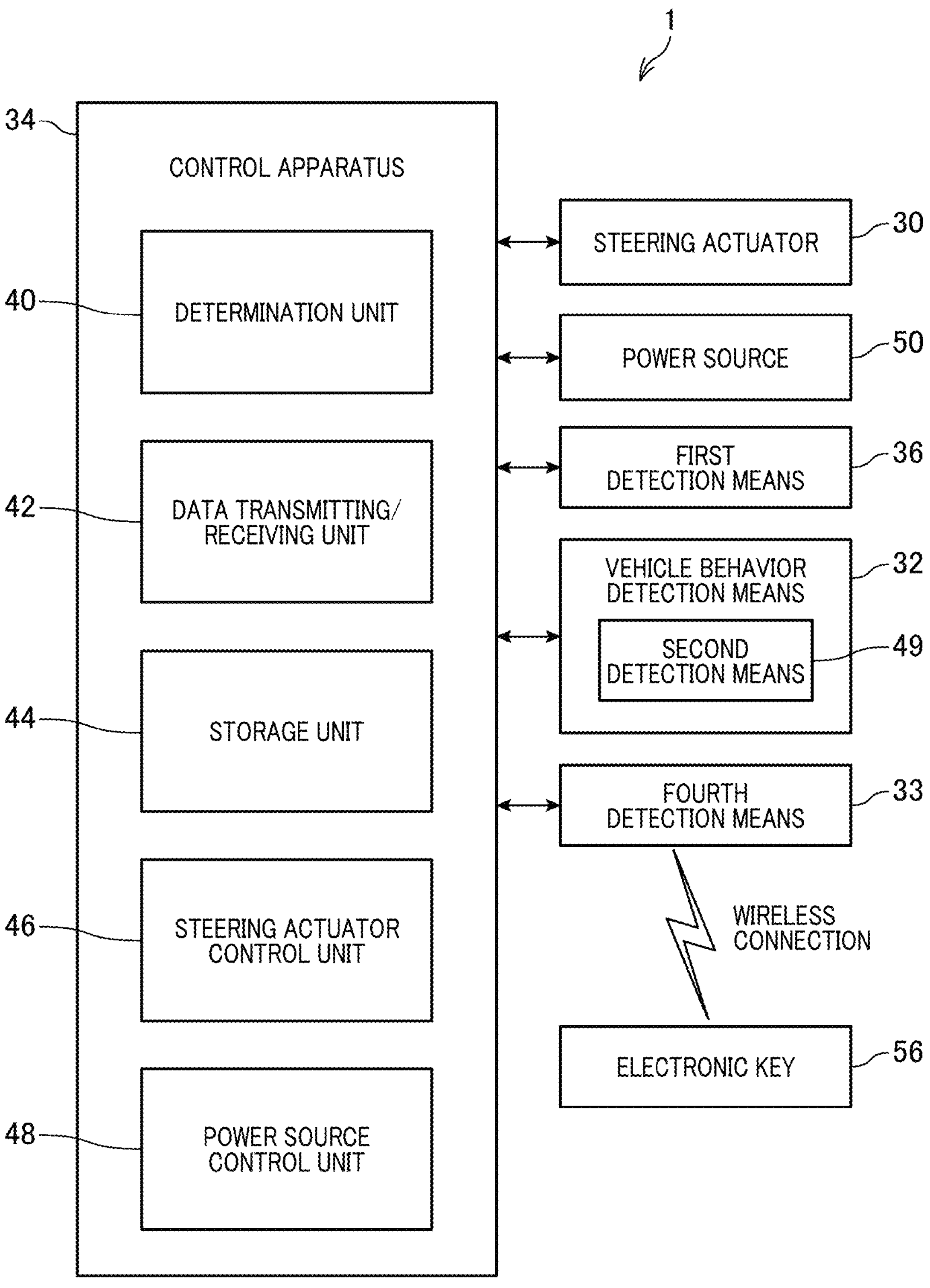
FIG. 2 is a block diagram showing a configuration of a control system in the saddle-ride vehicle according to a first embodiment.

FIG. 2 is a block diagram showing a configuration of a control system 1 in the saddle-ride vehicle 10 according to the present embodiment.

A steering actuator 30 is a drive apparatus that applies torque in the steering direction to the suspension apparatus 31 that supports the steering wheel 13. A power source 50 is a so-called battery that supplies electric power to the power unit 12, lighting and the like, and the control apparatus 34 to be described later. Fourth detection means 33 is a receiving apparatus that receives a wireless signal from an electronic key 56. The fourth detection means 33 detects the distance between the electronic key 56 and the vehicle 10. When the distance between the electronic key 56 and the corresponding vehicle 10 is within a predetermined distance, the rider U can start the power unit 12.

The control apparatus 34 includes a data transmitting/receiving unit 42 including an interface circuit that exchanges data between the CPU and other apparatuses, and a storage unit 44 that stores data. The storage apparatus included in the storage unit 44 may be, for example, an SSD (solid state device).

The control apparatus 34 is connected to the steering actuator 30, the power source 50, the first detection means 36, the vehicle behavior detection means 32, and the fourth detection means 33 via the data transmitting/receiving unit 42.

The control apparatus 34 controls the steering actuator 30 based on the angle θ between the roll axis R of the vehicle 10 and the longitudinal axis S of the support portions 37 detected by the first detection means 36, to apply torque to the suspension apparatus 31. The control apparatus 34 performs locking control to lock the steering angle at a handle neutral position if a predetermined condition is satisfied. Specifically, torque is applied so that the steering wheel 13 is directed toward the front FR. Furthermore, the control apparatus 34 performs lock release control to release the lock of the steering wheel 13 if a predetermined condition is satisfied. The parameters and control programs for each control are stored in the storage unit 44. The control apparatus 34 also includes a determination unit 40 that determines whether or not to perform various control.

The CPU executes a program stored in the storage unit 44 to realize the functions of the determination unit 40. The determination unit 40 determines that a predetermined condition is satisfied if the first detection means 36, the vehicle behavior detection means 32, etc. detect a physical quantity that satisfies the predetermined condition. Details of the determination processing will be described later.

The CPU executes the program stored in the storage unit 44, to realize the function of a steering actuator control unit 46 that controls the steering actuator 30 that applies torque in the steering direction to the suspension apparatus 31 that supports the handle 21.

Furthermore, the CPU executes the program stored in the storage unit 44, to realize the function of the power source control unit 48 that controls power supply from the power source 50 to each apparatus.

Figure 3:
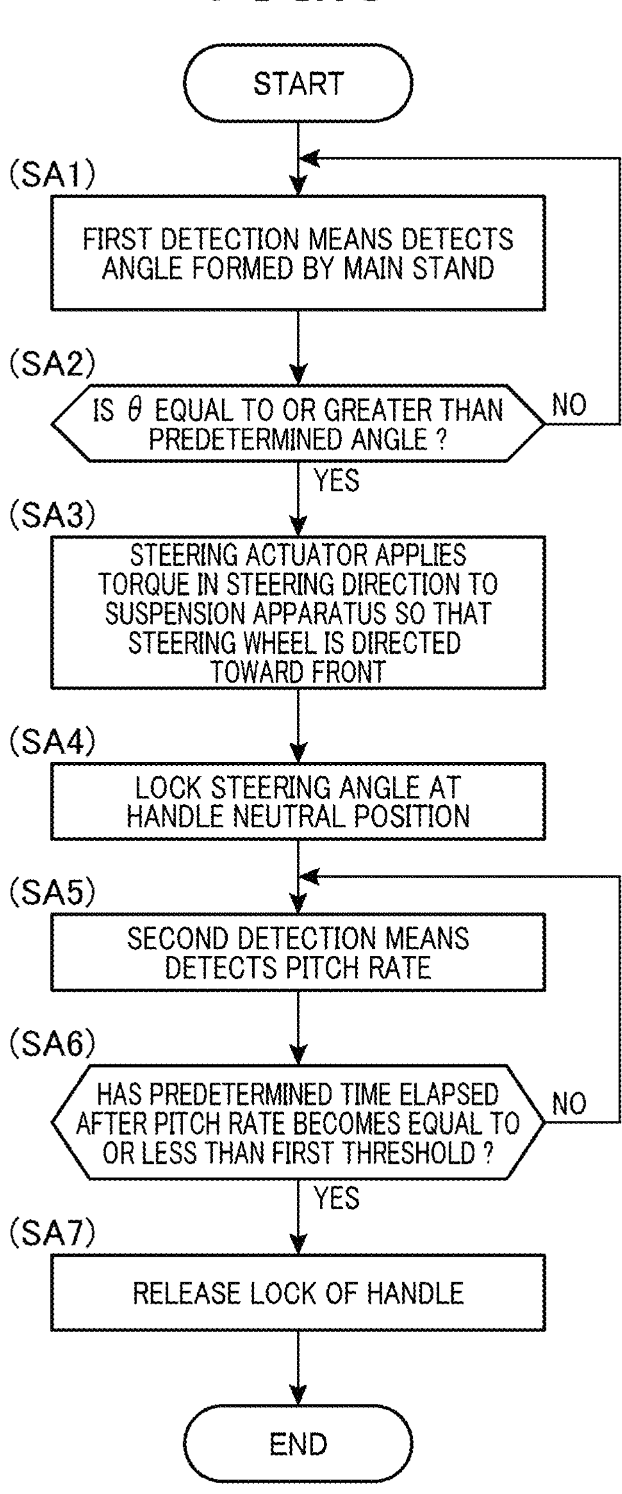
FIG. 3 is a flowchart of control processing.

FIG. 3 is a flowchart of control processing in the saddle-ride vehicle 10 according to the present embodiment. The control apparatus 34 performs control to apply steering torque to the suspension apparatus 31 based on information detected by the first detection means 36 while the vehicle is stopped. Furthermore, the control apparatus 34 stops the steering actuator 30 from applying steering torque to the suspension apparatus 31, for example, based on the pitch rate detected by the second detection means 49.

The operation of the control system 1 will be described.

The first detection means 36 detects the angle θ between the roll axis R of the vehicle 10 and the longitudinal axis S of the support portions 37 (step SA1). For example, when the main stand 35 is retracted, θ=0 degrees, and when the main stand 35 is upright to hold the vehicle, θ=90 degrees.

First, the operation of the control system 1 when the main stand 35 shifts from the retracted state to the upright state will be described.

The determination unit 40 determines whether or not the angle θ is equal to or greater than a predetermined angle (step SA2). If the angle θ is equal to or greater than the predetermined angle (step SA2: YES), the steering actuator control unit 46 controls the steering actuator 30. Specifically, the steering actuator 30 applies torque in the steering direction to the suspension apparatus 31, so that the steering wheel 13 is directed toward the front FR of the vehicle (step SA3). At this time, the handle 21 is placed at the handle neutral position where the steering wheel 13 is directed toward the front FR. The steering actuator control unit 46 performs locking control that applies torque to the steering actuator 30 in the steering direction and thereby locks the steering angle at the handle neutral position (step SA4).

If the angle θ is less than the predetermined angle (step SA2: NO), the process returns to step SA1.

Next, the second detection means 49 detects the pitch rate of the vehicle 10 (step SA5). The determination unit 40 determines whether a predetermined time has elapsed after the pitch rate becomes equal to or less than a predetermined first threshold (step SA6). If the determination unit 40 determines that the predetermined time has elapsed after the pitch rate becomes equal to or less than the first threshold (step SA6: YES), the steering actuator control unit 46 controls the steering actuator 30 to stop applying torque in the steering direction (step SA7). If the determination unit 40 determines that the predetermined time has not elapsed after the pitch rate becomes equal to or less than the first threshold (step SA6: NO), the process returns to step SA5.

The predetermined angle is, for example, 40 degrees. When the predetermined angle is 40 degrees, the main stand 35 is positioned slightly higher than the position where it touches the road surface G. When the main stand 35 shifts from the retracted state to the upright state, the steering actuator 30 applies torque through the suspension apparatus 31 to the front wheel 13 immediately before the main stand 35 touches the road surface G. This can prevent the attitude of the saddle-ride vehicle 10 from becoming unstable.

The predetermined time is, for example, 3 seconds. The first threshold is, for example, 5 degrees/second. Note that the predetermined angle, the predetermined time, and the first threshold may be stored in the storage unit 44 in advance.

The control described in FIG. 3 may be applied to the operation of shifting the main stand from the upright state to the retracted state. In that case, it is desirable that the predetermined angle be set between 90 degrees and 80 degrees. Also when the main stand 35 is shifted from the upright state to the retracted state, performing handle locking control as shown in FIG. 3 can prevent the front wheel (steering wheel) 13, which touches the road surface G, from becoming unstable.

Figure 4:
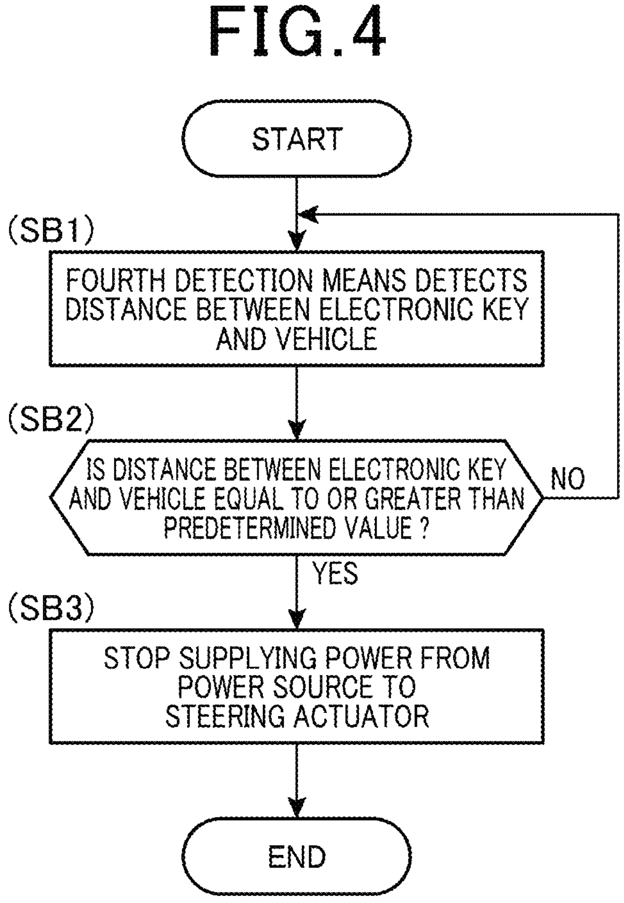
FIG. 4 is a flowchart of control processing regarding power supply from a power source.

FIG. 4 is a flowchart of control processing regarding power supply performed by the power source 50. The fourth detection means 33 detects the distance between the electronic key 56 and the vehicle 10 (step SB1). The determination unit 40 determines whether or not the distance between the electronic key 56 and the vehicle 10 is equal to or greater than a predetermined second threshold (step SB2). If the distance between the electronic key 56 and the vehicle 10 is equal to or greater than the second threshold (step SB2: YES), the power source control unit 48 stops the power supply from the power source 50 to the steering actuator 30 (step SB3). If the determination unit 40 determines that the distance between the electronic key 56 and the vehicle 10 is less than the predetermined value (step SB2: NO), the process returns to step SB1.

Here, the electronic key 56 is connected to the vehicle 10 with a wireless technology such as NFC (Near Field Communication)® or Bluetooth®. Therefore, the information regarding whether or not the wireless connection is disconnected may replace the distance detection. Specifically, instead of determination unit 40 comparing the distance between the electronic key 56 and the vehicle 10 with the second threshold for determination, there may be performed the following processing: the power source 50 supplies power to the steering actuator 30 when there is wireless connection; and the power source 50 stops supplying power to the steering actuator 30 when there is disconnected wireless connection.

Note that the second threshold used in the above determination by the determination unit 40 is, for example, 10 m. The second threshold may be stored in the storage unit 44 in advance.

As a modified embodiment, the first detection means 36 may be a sensor that detects information regarding whether or not the main stand 35 is retracted, rather than detecting the angle θ between the roll axis R of the vehicle 10 and the longitudinal axis S of the support portions 37. For example, the sensor may be a switch that is turned on when the main stand 35 is in the retracted state.

Specifically, when the sensor detects that the main stand 35 is not in the retracted state, the control apparatus 34 controls the steering actuator 30 to be locked. Furthermore, if a predetermined condition is satisfied, the control apparatus 34 controls the steering actuator 30 to be released from lock.

Figure 5:
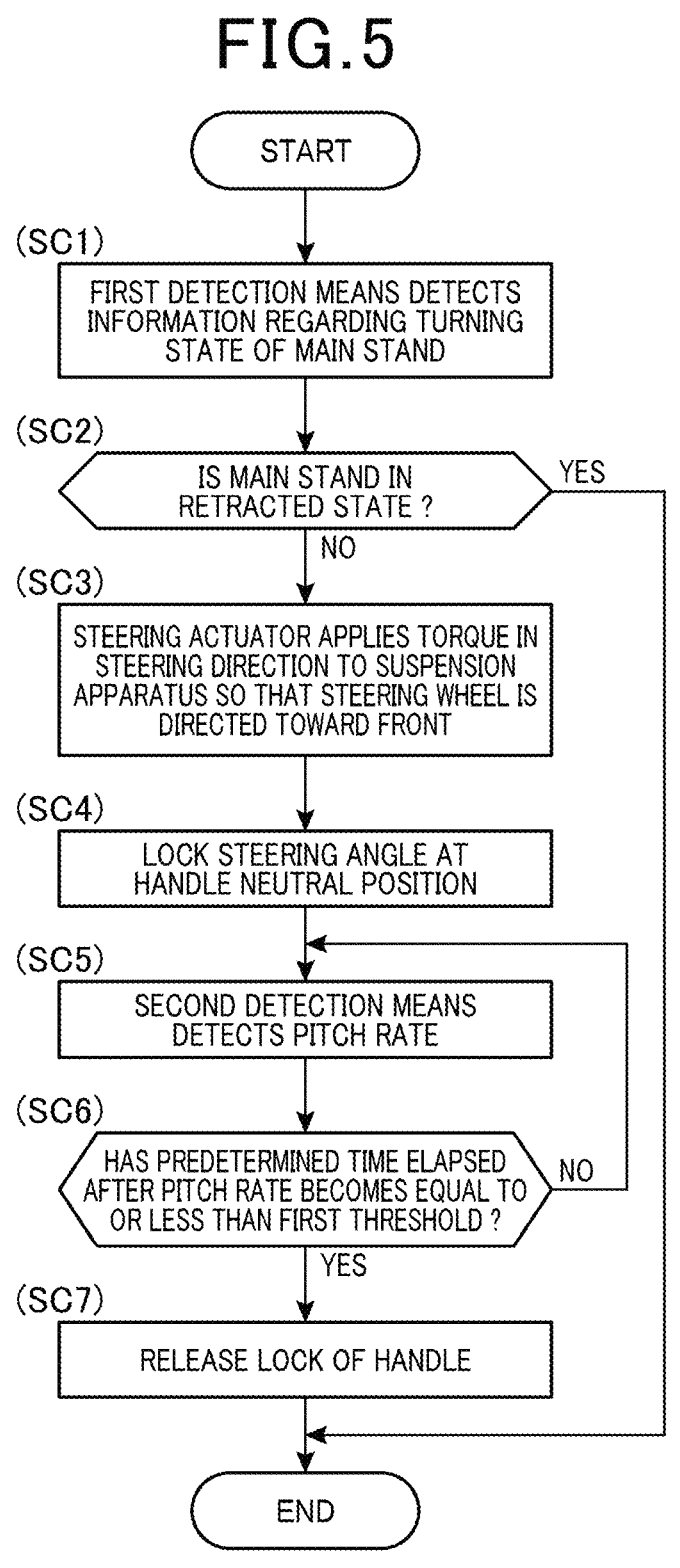

FIG. 5 is a flowchart of the control processing of the control system 1 included in the vehicle 10 according to the present modified embodiment.

The operation of the control system 1 when the main stand 35 shifts from the retracted state to the upright state will be described.

First, the first detection means 36 detects information regarding the turning state of the main stand 35 (step SC1). The determination unit 40 determines whether or not the main stand 35 is in the retracted state based on the information regarding the turning state (step SC2). If it is determined that the main stand 35 is not in the retracted state (step SC2: NO), the steering actuator control unit 46 causes the steering actuator 30 to apply torque in the steering direction to the suspension apparatus 31, to cause the steering wheel 13 to be directed toward the front FR of the vehicle (step SC3). At this time, the handle 21 is at the handle neutral position where the steering wheel 13 is directed toward the front FR. The steering actuator 30 applies torque to the suspension apparatus 31 in the steering direction, thereby locking the steering angle at the handle neutral position (step SC4).

Next, the second detection means 49 detects the pitch rate of the vehicle 10 (step SC5). The determination unit 40 determines whether a predetermined time has elapsed after the pitch rate becomes equal to or less than the first threshold (step SC6). If the determination unit 40 determines that the predetermined time has elapsed after the pitch rate becomes equal to or less than the first threshold (step SC6: YES), the steering actuator control unit 46 stops applying torque to the steering actuator 30 in the steering direction (step SC7). If the determination unit 40 determines that the predetermined time has not elapsed after the pitch rate becomes equal to or less than the first threshold (step SC6: NO), the process returns to step SC5.

If the determination unit 40 determines that the main stand 35 is in the retracted state based on the information regarding the turning state (step SC2: YES), the control apparatus 34 does not control the steering actuator 30 to be locked.

The control described in FIG. 5 may be applied to the operation of shifting the main stand from the upright state to the retracted state. Also when the main stand 35 is shifted from the upright state to the retracted state, performing the handle locking control as shown in FIG. 5 can prevent the front wheel (steering wheel) 13, which touches the road surface G, from becoming unstable.

Second Embodiment

Figure 6:
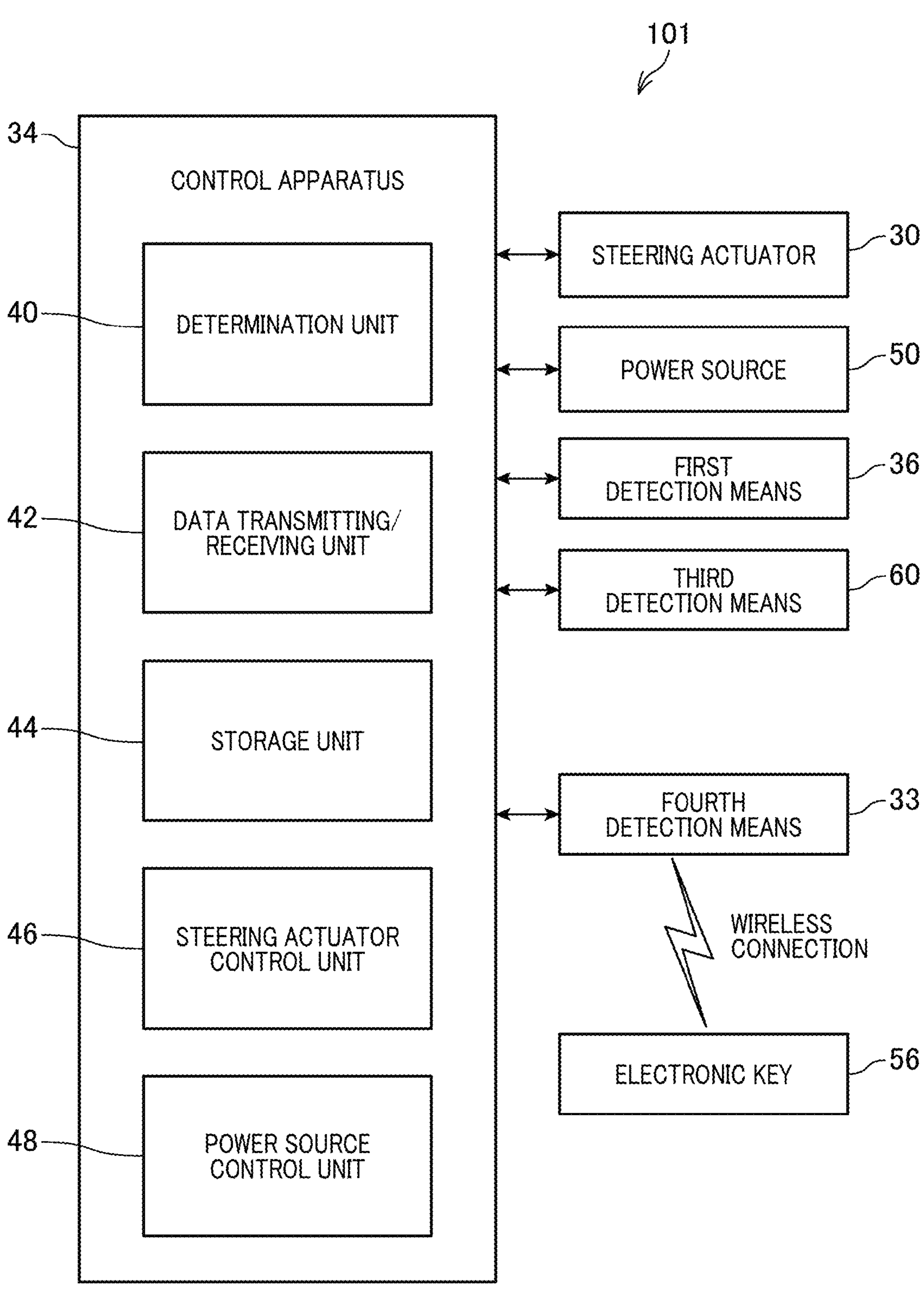
FIG. 6 is a block diagram showing a configuration of a control system in the saddle-ride vehicle according to a second embodiment.

FIG. 6 is a block diagram showing a configuration of a control system 101 in the saddle-ride vehicle 10 according to a second embodiment. The configuration of the saddle-ride vehicle 10 according to the second embodiment is similar to the configuration of the above-described embodiment (hereinafter referred to as the first embodiment), so detailed description thereof will be omitted.

The control system 101 includes a third detection means 60 (not shown) that detects the length of a suspension. Note that in the present description, the suspension is a rear suspension 38 related to the rear wheel 15. In the case of the vehicle 10 having a structure in which the front wheel (steering wheel) 13 is off the road surface G when the main stand 35 is upright to hold the vehicle, the length of the suspension to be detected may be the length of the front suspension, and the third detection means 60 may detect the length of the front suspension.

The third detection means 60 is connected to the control apparatus 34 via the data transmitting/receiving unit 42. The detected length of the suspension is used for determination in the determination unit 40 (see FIG. 7, which will be described later). Note that the other configuration of the control system 101 is the same as the control system 1 according to the first embodiment.

Figure 7:
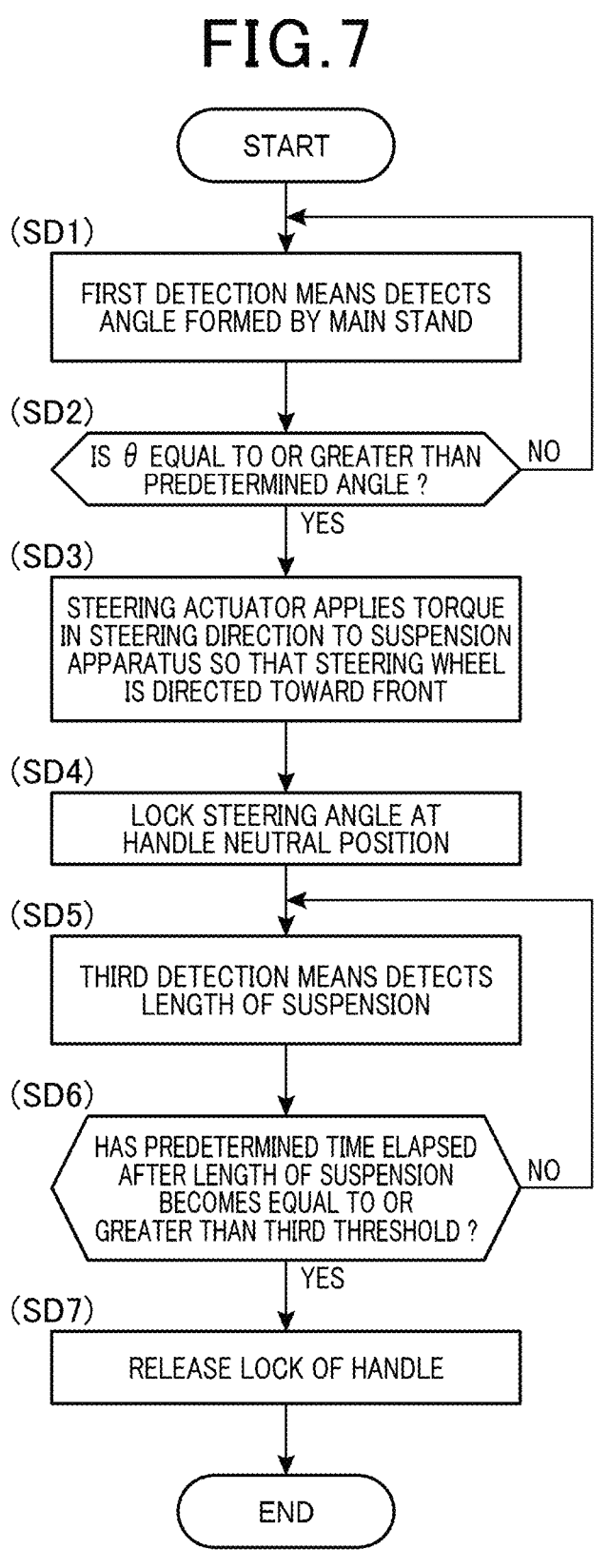

FIG. 7 is a flowchart of control processing in the saddle-ride vehicle 10 according to the second embodiment. Here, the operation of the control system 101 when the main stand 35 shift from the upright state to the retracted state will be described.

The first detection means 36 detects the angle θ between the roll axis R of the vehicle 10 and the longitudinal axis S of the support portions 37 (step SD1). For example, when the main stand 35 is retracted, θ=0 degrees, and when the main stand 35 is upright to hold the vehicle, θ=90 degrees.

The determination unit 40 determines whether or not the angle θ is equal to or greater than a predetermined angle (step SD2). If the angle θ is equal to or greater than the predetermined angle (step SD2: YES), the steering actuator control unit 46 of the control apparatus 34 controls the steering actuator 30. Specifically, the steering actuator 30 applies torque in the steering direction to the suspension apparatus 31, to cause the steering wheel 13 to be directed toward the front FR of the vehicle (step SD3). At this time, the handle 21 is placed in the handle neutral position where the steering wheel 13 is directed straight toward the front FR. The steering actuator control unit 46 applies torque to the steering actuator 30 in the steering direction, to perform locking control to lock the steering angle at the handle neutral position (step SD4).

If the angle θ is less than the predetermined angle (step SD2: NO), the process returns to step SD1.

Next, the third detection means 60 detects the length of the rear suspension 38 of the vehicle 10 (step SD5). The determination unit 40 determines whether or not the length is equal to or less than a predetermined third threshold (step SD6). If the determination unit 40 determines that the length is equal to or less than the third threshold (step SD6: YES), the steering actuator control unit 46 performs lock release control to stop applying torque to the steering actuator 30 in the steering direction (step SD7). If the determination unit 40 determines that the length is longer than the third threshold (step SD6: NO), the process returns to step SD5.

The predetermined angle is, for example, between 90 degrees and 80 degrees. The predetermined time is, for example, 3 seconds. Note that the predetermined angle, the predetermined time, and the third threshold may be stored in the storage unit 44 in advance.

Note that control may be performed to release the lock of the handle after a predetermined time has elapsed after the length of the suspension becomes equal to or less than the third threshold. Performing such control makes it possible to release the locking control of the handle after the wheel securely touches the road surface, allowing the rider to stably operate the vehicle.

Here, the same control as that in FIG. 7 may be applied to the operation of shifting the main stand 35 from the retracted state to the upright state. In other words, the control apparatus 34 may control the handle to be locked until the length of the suspension is equal to or greater than a predetermined value. Furthermore, if the determination unit 40 determines that the length of the suspension has become equal to or greater than the predetermined value, the control apparatus 34 may determine that the steering wheel 13 is off the road surface and the vehicle is held on the main stand, to stop the locking control of the handle.

CONFIGURATION SUPPORTED BY THE ABOVE EMBODIMENTS

The above embodiments support the following configurations.

Configuration 1

A saddle-ride vehicle including: a main stand that is turnably provided on a vehicle body and holds the vehicle body so that the vehicle body does not topple over; a first detection unit that detects a turning state of the main stand; a steering actuator that applies torque in a steering direction to a suspension apparatus supporting a steering wheel; and a control apparatus that controls the steering actuator to apply the torque to the suspension apparatus, in which wherein the control apparatus performs control to apply the torque so that the steering wheel is directed toward a front, depending on the turning state of the main stand.

According to such a configuration, it is possible to prevent the vehicle attitude from becoming unstable when the rider stops the vehicle to be in operation to hold the vehicle body on the main stand.

Configuration 2

The saddle-ride vehicle according to Configuration 1, further including second detection means that detects a pitch rate of the vehicle body, in which the control apparatus stops applying the torque that directs the steering wheel toward a front, based on the pitch rate.

With this configuration, the electric power to be supplied to the steering actuator can be cut off when the main stand is not being operated. Therefore, there is an effect of saving electric power of the power source.

Configuration 3

The saddle-ride vehicle according to Configuration 1, further including third detection means that detects an expansion/contraction state of a suspension of the vehicle body, in which the control apparatus stops applying the torque to direct the steering wheel toward a front if it is determined that a wheel corresponding to a suspension of the vehicle body touches a road surface, based on expansion/contraction state of the suspension.

With this configuration, when the rider shifts the main stand between the upright state and the retracted state, the steering actuator can continue to apply torque to the suspension apparatus to stabilize the vehicle. Furthermore, when the vehicle body is not held by the main stand, the electric power to be supplied to the steering actuator can be cut off. Therefore, there is an effect of saving electric power of the power source.

Configuration 4

The saddle-ride vehicle according to any of Configurations 1 to 4, further including: a fourth detection means that detects a distance between an electronic key required to operate the vehicle body, and the vehicle body; and a power source that supplies electric power to the steering actuator, in which the control apparatus controls on/off of power supply from the power source to the steering actuator, based on a distance between the electronic key and the vehicle body.

With this configuration, when the rider leaves the vehicle, the power supply to the steering actuator can be stopped. Therefore, there is an effect of saving electric power of the power source.

The embodiment described above illustrates an aspect of the present invention, and can be modified and applied in any way without departing from the spirit of the present invention. Of course, there may be an aspect in which the first embodiment and the second embodiment are combined.

In addition, the processing units in the flowcharts shown in FIGS. 3, 4, 5 and 7 are divided according to the main processing substance in order to facilitate understanding of the processing of the control apparatus 34, and the present disclosure is not limited by the way of division or the name of the processing unit.

The processing of the control apparatus 34 can be divided into more processing units depending on the processing substance, or can be divided so that one processing unit includes even more processing. Furthermore, the processing order in the above flowchart is not limited to the illustrated example.

REFERENCE SIGNS LIST

- 1 control system
- 5 vehicle body
- 13 front wheel (steering wheel)
- 30 steering actuator
- 31 suspension apparatus
- 32 vehicle behavior detection means
- 33 fourth detection means
- 34 control apparatus
- 35 main stand
- 36 first detection means
- 38 suspension
- 40 determination unit
- 49 second detection means
- 50 power source
- 56 electronic key
- 60 third detection means

The invention claimed is:

1. A saddle-ride vehicle comprising:

a main stand turnably provided on a vehicle body, the main stand causing a rear wheel to touch a road surface in a retracted state, the main stand holding the vehicle body with a rear wheel being off a road surface in an upright state;

a first detection unit that detects a turning state of the main stand;

a steering actuator that applies torque in a steering direction to a suspension apparatus supporting a steering wheel; and a control apparatus that controls the steering actuator to apply the torque to the suspension apparatus, wherein the control apparatus performs control to apply the torque so that the steering wheel is directed toward a front, depending on the turning state of the main stand.

2. The saddle-ride vehicle according to claim 1, wherein the control apparatus performs control to apply the torque so that a steering angle is at a handle neutral position, depending on the turning state of the main stand.

3. The saddle-ride vehicle according to claim 1, further comprising:

a fourth detection means that detects a distance between an electronic key required to operate the vehicle body, and the vehicle body; and a power source that supplies electric power to the steering actuator, wherein the control apparatus controls on/off of power supply from the power source to the steering actuator, based on a distance between the electronic key and the vehicle body.

4. A saddle-ride vehicle comprising:

a main stand that is turnably provided on a vehicle body and holds the vehicle body so that the vehicle body does not topple over;

a first detection unit that detects a turning state of the main stand;

a steering actuator that applies torque in a steering direction to a suspension apparatus supporting a steering wheel;

a control apparatus that controls the steering actuator to apply the torque to the suspension apparatus, wherein the control apparatus performs control to apply the torque so that the steering wheel is directed toward a front, depending on the turning state of the main stand; and second detection means that detects a pitch rate of the vehicle body, wherein the control apparatus stops control to apply the torque so that the steering wheel-wheel is directed toward a front, based on the pitch rate.

5. The saddle-ride vehicle according to claim 4, wherein the control apparatus:

determines whether a predetermined time has elapsed after a pitch rate becomes equal to or less than a first predetermined threshold, and stops control to apply the torque in a steering direction if it is determined that the predetermined time has elapsed after a pitch rate becomes equal to or less than a first threshold.

6. The saddle-ride vehicle according to claim 4, wherein, if it is determined that a length of a suspension of the vehicle body is equal to or less than a predetermined value, the control apparatus stops control to apply the torque so that the steering wheel is directed toward a front.

7. A saddle-ride vehicle comprising:

a main stand that is turnably provided on a vehicle body and holds the vehicle body so that the vehicle body does not topple over;

a first detection unit that detects a turning state of the main stand;

a steering actuator that applies torque in a steering direction to a suspension apparatus supporting a steering wheel;

a control apparatus that controls the steering actuator to apply the torque to the suspension apparatus, wherein the control apparatus performs control to apply the torque so that the steering wheel is directed toward a front, depending on the turning state of the main stand; and third detection means that detects an expansion/contraction state of a suspension of the vehicle body, wherein the control apparatus stops applying the torque to direct the steering wheel toward a front if it is determined that a wheel corresponding to a suspension of the vehicle body touches a road surface, based on an expansion/contraction state of the suspension.

* * * * *